(12) United States Patent
Sunata et al.

(10) Patent No.: US 11,687,284 B2
(45) Date of Patent: Jun. 27, 2023

(54) MEMORY SYSTEM WITH MEMORY CONTROLLER

(71) Applicant: Kioxia Corporation, Tokyo (JP)

(72) Inventors: Tetsuya Sunata, Yokohama Kanagawa (JP); Takumi Fujimori, Yokohama Kanagawa (JP); Takahiro Kurita, Sagamihara Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/410,789

(22) Filed: Aug. 24, 2021

(65) Prior Publication Data

US 2022/0300204 A1 Sep. 22, 2022

(30) Foreign Application Priority Data

Mar. 18, 2021 (JP) .............................. JP2021-044250

(51) Int. Cl.
 *G06F 3/06* (2006.01)
(52) U.S. Cl.
 CPC .......... *G06F 3/0659* (2013.01); *G06F 3/0619* (2013.01); *G06F 3/0656* (2013.01); *G06F 3/0679* (2013.01)

(58) Field of Classification Search
 CPC .... G06F 3/0659; G06F 3/0619; G06F 3/0656; G06F 3/0679
 See application file for complete search history.

(56) References Cited

U.S. PATENT DOCUMENTS

| | | |
|---|---|---|
| 10,528,469 B2 | 1/2020 | Koo et al. |
| 10,534,709 B2 | 1/2020 | Oshinsky et al. |
| 10,573,391 B1 | 2/2020 | Palmer |
| 2017/0031604 A1 | 2/2017 | Lotem et al. |
| 2018/0018101 A1* | 1/2018 | Benisty ................. G06F 3/0659 |
| 2019/0114255 A1* | 4/2019 | Jain ......................... G06F 3/068 |
| 2022/0043570 A1* | 2/2022 | Richter ................. G06F 3/0688 |

* cited by examiner

*Primary Examiner* — Edward J Dudek, Jr.
(74) *Attorney, Agent, or Firm* — Foley & Lardner LLP

(57) ABSTRACT

A memory system includes a nonvolatile memory, a volatile memory, and a memory controller. The volatile memory includes a write buffer. The memory controller receives commands stored in a queue by a host device from the queue. The memory controller receives a command stored in a queue by the host device from the queue and, in a state where first data not satisfying a write unit is stored in the write buffer, when receiving a first command for writing the first data to the nonvolatile memory from the queue, simultaneously writes the first data and second data acquired from the host device or a predetermined region of the volatile memory different from the write buffer to the nonvolatile memory.

20 Claims, 13 Drawing Sheets

FIG. 4

| | |
|---|---|
| 0x101C0 | SQ#7 |
| 0x10180 | SQ#6 |
| 0x10140 | SQ#5 |
| 0x10100 | SQ#4 |
| 0x100C0 | SQ#3 |
| 0x10080 | SQ#2 |
| 0x10040 | SQ#1 |
| 0x10000 | SQ#0 |

FIG. 5

| | | |
|---|---|---|
| SQ#7 | | |
| SQ#6 | | |
| SQ#5 | | |
| SQ#4 | | Tail |
| SQ#3 | CMD#3 | |
| SQ#2 | CMD#2 | |
| SQ#1 | CMD#1 | |
| SQ#0 | CMD#0 | |

MEMORY SYSTEM WITH MEMORY CONTROLLER

CROSS-REFERENCE TO RELATED APPLICATION

This application is based upon and claims the benefit of priority from Japanese Patent Application No. 2021-044250, filed Mar. 18, 2021, the entire contents of which are incorporated herein by reference.

FIELD

Embodiments described herein relate generally to a memory system.

BACKGROUND

A memory system writes data stored in a volatile memory to a nonvolatile memory when a predetermined command is received from a host device.

DESCRIPTION OF THE DRAWINGS

FIG. 4 is a diagram illustrating an example of an address map of a submission queue according to the first embodiment.

FIG. 5 is a diagram illustrating an example of a storage state of a command of the submission queue according to the first embodiment.

DETAILED DESCRIPTION

Figure 1:
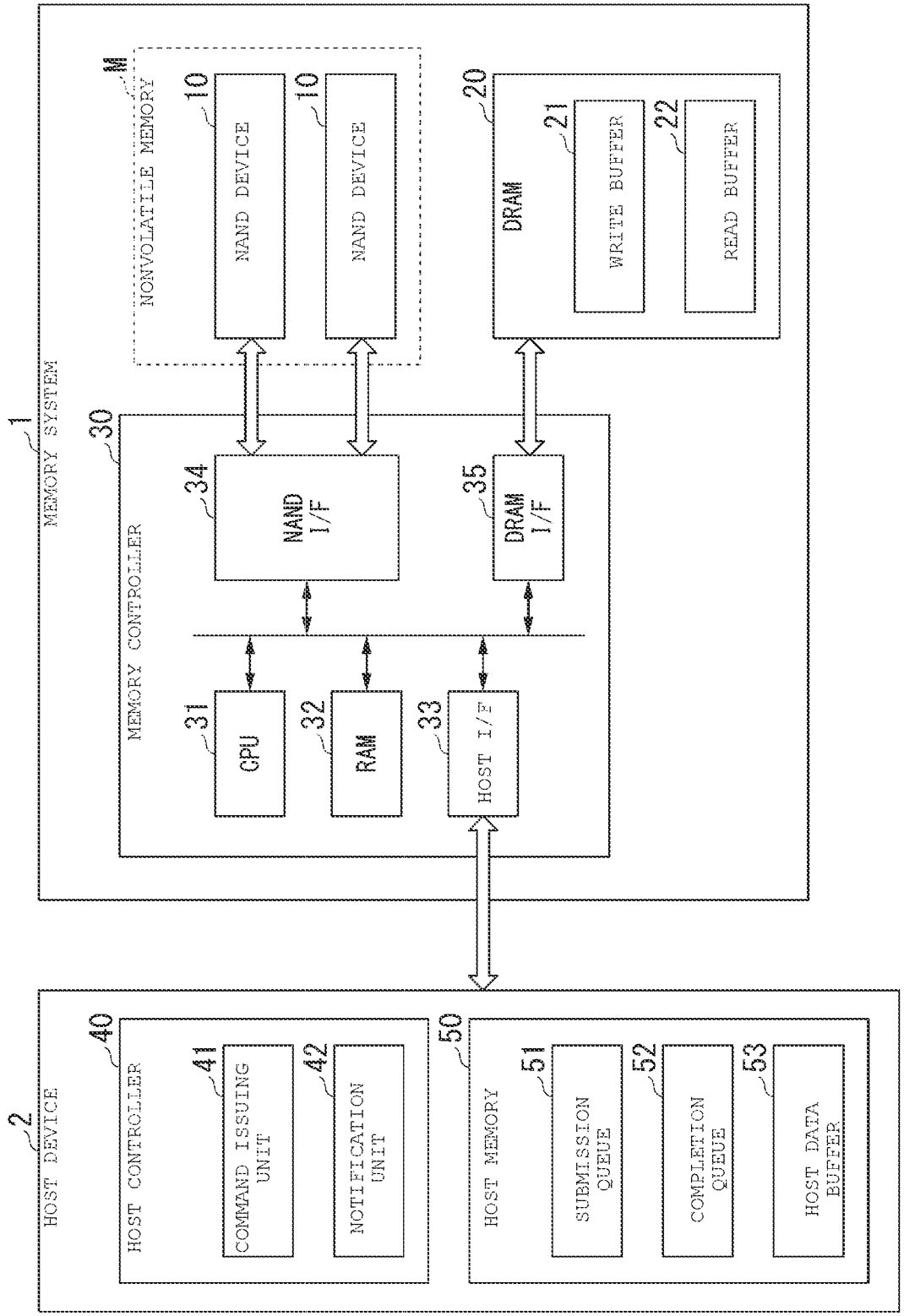
FIG. 1 is a block diagram illustrating an overall configuration of a memory system according to a first embodiment.

At least one embodiment provides a memory system capable of improving reliability.

According to at least one embodiment, a memory system includes a nonvolatile memory, a volatile memory, and a memory controller configured to perform various functions. The volatile memory includes a write buffer. The memory controller receives commands stored in a queue of the memory system by a host device from the queue. The memory controller receives a command stored in a queue by the host device from the queue and, in a state where first data not satisfying a write unit is stored in the write buffer, when receiving a first command for writing the first data to the nonvolatile memory from the queue, simultaneously writes the first data and second data acquired from the host device or a predetermined region of the volatile memory different from the write buffer to the nonvolatile memory.

Hereinafter, the memory system of at least one embodiment will be described with reference to drawings. In the following description, configurations having the same or similar functions are designated by the same reference numerals. Then, the duplicate description of those configurations may be omitted. "Based on XX" means "based on at least XX" and may include cases based on other factors in addition to XX. Further, "based on XX" is not limited to the case where XX is used directly, but may also include cases based on the calculation or processing of XX. "XX" is any element (for example, any information). "Coupling" is not limited to mechanical couplings and may include electrical couplings.

That is, the "coupling" is not limited to the case of being directly coupled to an object, but may also include the case of being coupled with another element intervening.

First Embodiment

1. Overall Configuration of Memory System

FIG. 1 is a block diagram illustrating an overall configuration of a memory system according to a first embodiment. A memory system 1 is a storage device such as a solid state drive (SSD). The memory system 1 communicates with an external host device 2 and executes various operations in response to an instruction from the host device 2. The memory system 1 includes, for example, one or more NAND devices 10, a dynamic random access memory (DRAM) 20, and a memory controller 30.

The NAND device 10 is a nonvolatile semiconductor storage device that stores data in a nonvolatile manner, and is, for example, a NAND flash memory. In at least one embodiment, an example of a "nonvolatile memory M" is implemented by a plurality of NAND devices 10. However, the number of NAND devices 10 in the memory system 1 may be one. In this case, one NAND device 10 constitutes an example of the "nonvolatile memory M". The NAND device 10 will be described in detail later.

The DRAM 20 is a volatile semiconductor storage device used as a storage region of the memory controller 30. The DRAM 20 is an example of a "volatile memory". The DRAM 20 functions as a buffer for data transfer between the host device 2 and the NAND device 10. The DRAM 20 includes, for example, a write buffer 21 and a read buffer 22. The write buffer 21 is a data buffer that temporarily stores data to be written (hereinafter, referred to as "write data") received from the host device 2. The read buffer 22 is a data buffer that temporarily stores data to be read (hereinafter, referred to as "read data") read from the NAND device 10. The DRAM 20 may be built in the memory controller 30.

The memory controller 30 executes data write, read, erasing, and the like on the NAND device 10 in response to an instruction from the host device 2. The memory controller 30 includes, for example, a central processing unit (CPU) 31, a random access memory (RAM) 32, a host interface circuit (host I/F) 33, a NAND interface circuit (NAND I/F) 34, and a DRAM interface circuit (DRAM I/F) 35. For example, the memory controller 30 is a system on a chip (SoC) in which these configurations are integrated into one chip.

The CPU 31 is an example of a hardware processor. The CPU controls the operation of the memory controller 30 by executing the firmware loaded in the RAM 32, for example. The RAM 32 is used as a work region of the CPU 31, and stores firmware for managing the NAND device 10, various management tables, and the like.

The memory controller 30 executes data management of the NAND device 10. This data management includes management of mapping information indicating a correspondence relationship between each logical address and each physical address of the NAND device 10. The logical address is an address used by the host device 2 to address the memory system 1. As this logical address, for example, a logical block address (LBA) is used.

Management of the mapping between each logical block address (LBA) and each physical address is executed by using a look-up table that functions as an address conversion table (logical-to-physical address conversion table). The memory controller 30 manages the mapping between each LBA and each physical address in a predetermined management size unit by using the look-up table. The physical address corresponding to a certain LBA indicates the physical storage position of the NAND device 10 in which the data of this LBA is written. The look-up table may be loaded from the NAND device 10 into the DRAM 20 when the power of the memory system 1 is turned on.

The memory controller 30 obtains the physical address corresponding to the LBA based on the entry in the look-up table corresponding to the LBA and reads the data in accordance with the read command from the NAND device 10. The memory controller 30 returns the data based on the read data as a response to the read command to the host device 2 together with a notification indicating that the read operation has been completed.

The host I/F 33 is coupled to the host device 2 via a host bus, and communicates data, commands, and addresses between the memory controller 30 and the host device 2. The host I/F 33 conforms to communication interface standards such as NVM Express (NVMe) (registered trademark), serial advanced technology attachment (SATA), serial attached SCSI (SAS), or PCI Express (PCIe) (registered trademark).

The NAND I/F 34 communicates data, commands, and addresses between the memory controller 30 and the NAND device 10. The NAND I/F 34 conforms to the NAND interface standard. The DRAM I/F 35 is coupled to the DRAM 20 and communicates between the memory controller 30 and the DRAM 20. The DRAM I/F 35 conforms to the DRAM interface standard.

Figure 2:
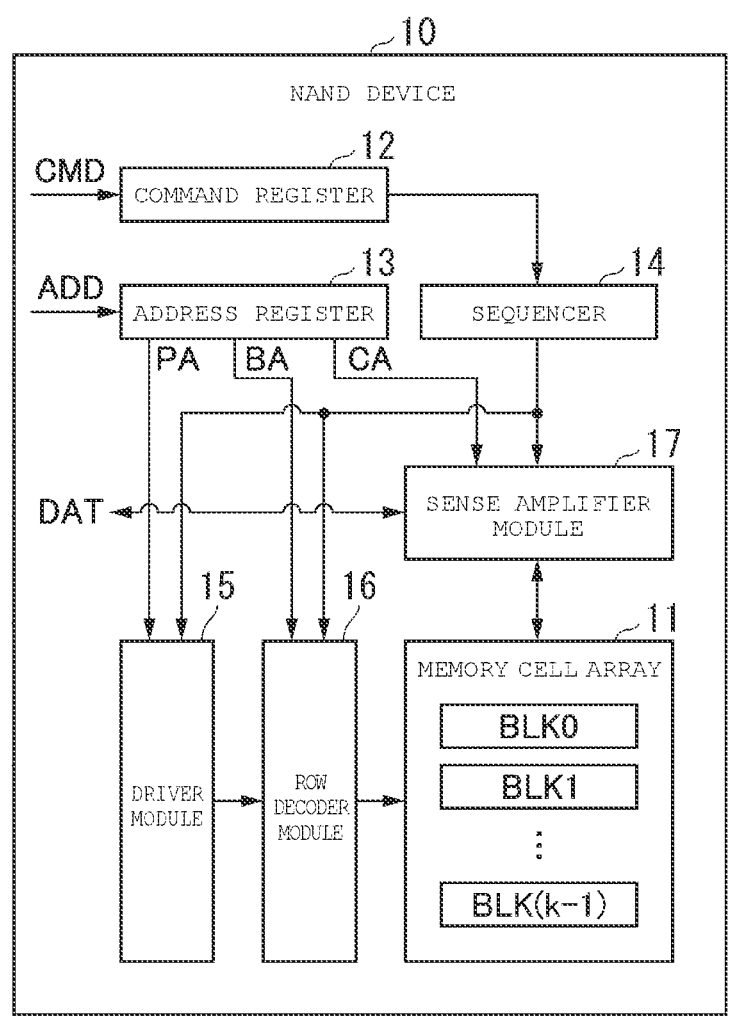
FIG. 2 is a block diagram illustrating a configuration of a NAND device according to the first embodiment.

FIG. 2 is a block diagram illustrating the configuration of the NAND device 10. The NAND device 10 includes, for example, a memory cell array 11, a command register 12, an address register 13, a sequencer 14, a driver module 15, a row decoder module 16, and a sense amplifier module 17.

The memory cell array 11 includes a plurality of blocks BLK0 to BLK (k-1) (k is an integer of 1 or more). The block BLK is a set of a plurality of memory cells that store data in a nonvolatile way. The block BLK is used as a unit of erasing data. The memory cell array 11 is provided with a plurality of bit lines and a plurality of word lines. Each memory cell is associated with a bit line and a word line.

The command register 12 stores the command CMD received by the NAND device 10 from the memory controller 30. The command CMD includes, for example, an instruction to cause the sequencer 14 to execute a write operation, a read operation, an erasing operation, or the like.

The address register 13 stores an address information ADD received by the NAND device 10 from the memory controller 30. The address information ADD includes, for example, a block address BA, a page address PA, and a column address CA. The block address BA, page address PA, and column address CA are used to select the block BLK, word line, and bit line, respectively.

The sequencer 14 is a control circuit that controls the operation of the NAND device 10. For example, the sequencer 14 controls the driver module 15, the row decoder module 16, the sense amplifier module 17, and the like based on the command CMD stored in the command register 12 and executes a write operation, a read operation, an erasing operation, and the like.

The driver module 15 generates a voltage used in a write operation, a read operation, an erasing operation, or the like. The driver module 15 applies the generated voltage to the signal line corresponding to the selected word line based on the page address PA stored in the address register 13, for example.

The row decoder module 16 selects one block BLK in the corresponding memory cell array 11 based on the block address BA stored in the address register 13. The row decoder module 16 transfers, for example, the voltage applied to the signal line corresponding to the selected word line to the selected word line in the selected block BLK.

In a write operation, the sense amplifier module 17 applies a desired voltage to each bit line in response to a write data DAT received from the memory controller 30. In a read operation, the sense amplifier module 17 determines the data stored in the memory cell based on the voltage of the bit line and transfers the determination result as a read data DAT to the memory controller 30.

Figure 3:
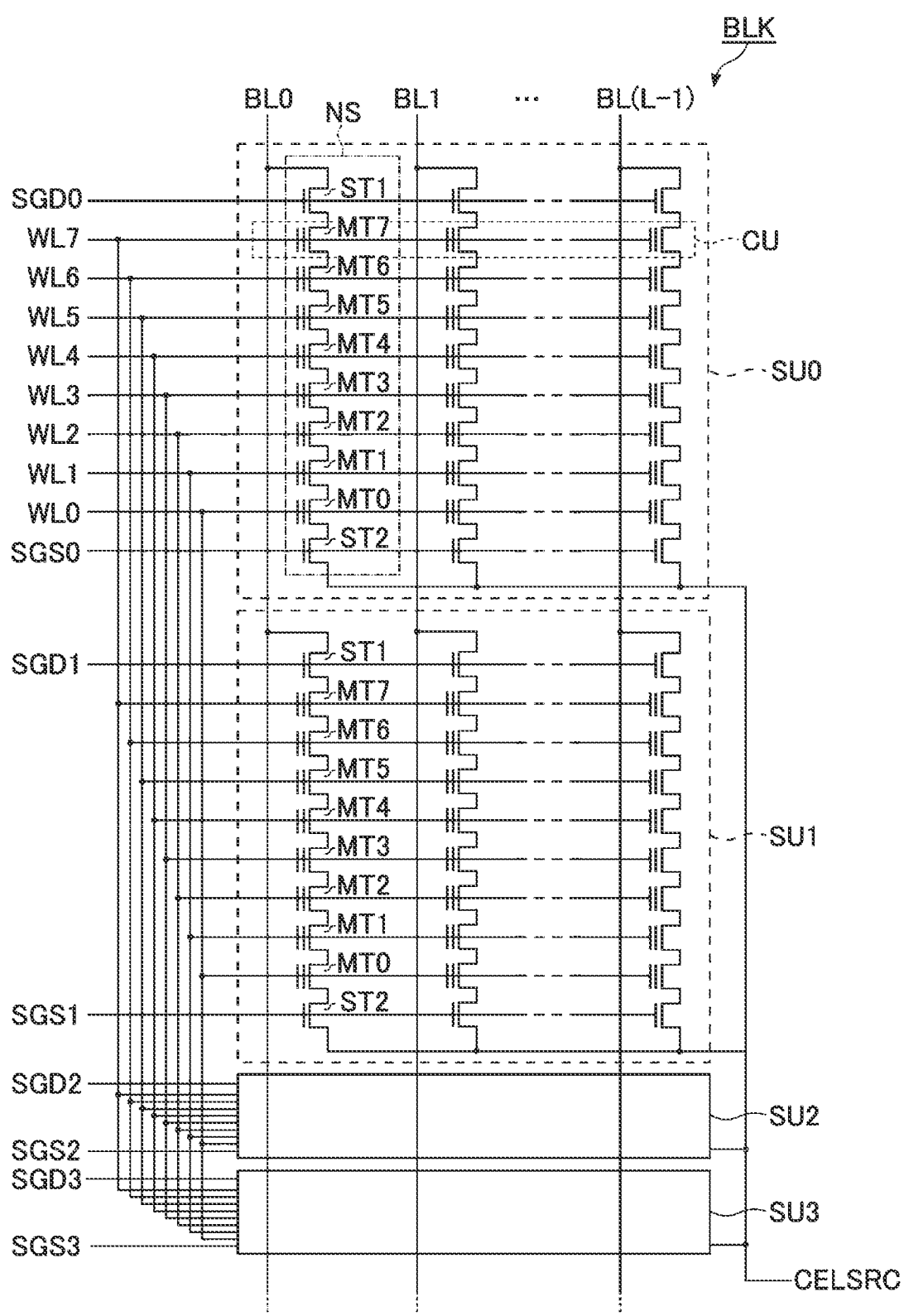
FIG. 3 is a diagram illustrating a circuit configuration in a memory cell array according to the first embodiment.

FIG. 3 is a diagram illustrating a circuit configuration in the memory cell array 11, and illustrates one block BLK extracted from a plurality of blocks BLK in the memory cell array 11. The block BLK includes, for example, four string units SU0 to SU3.

Each string unit SU includes a plurality of NAND strings NS associated with bit lines BL0 to BL(L-1) (L is an integer of 1 or more). Hereinafter, when the bit lines BL0 to BL(L-1) are referred to as "bit line BL" when not distinguished from each other. Each NAND string NS includes, for example, memory cell transistors MT0 to MT7, a first select transistor ST1, and a second select transistor ST2. Each memory cell transistor MT includes a control gate and a charge storage layer to store data in a nonvolatile way. The first select transistor ST1 and the second select transistor ST2 are used for selecting the NAND string NS during various operations.

In each NAND string NS, the memory cell transistors MT0 to MT7 are coupled in series. The drain of the first select transistor ST1 is coupled to the bit line BL corresponding to the NAND string NS. The source of the select transistor ST1 is coupled to one end of the memory cell transistors MT0 to MT7 coupled in series. The drain of the second select transistor ST2 is coupled to the other end of the memory cell transistors MT0 to MT7 coupled in series. The source of the second select transistor ST2 is coupled to a source line SL.

In the same block BLK, the control gates of the memory cell transistors MT0 to MT7 are commonly coupled to word lines WL0 to WL7, respectively. The gates of the first select transistors ST1 in the string units SU0 to SU3 are commonly coupled to select gate lines SGD0 to SGD3, respectively. The gates of the second select transistors ST2 in the string units SU0 to SU3 are commonly coupled to select gate lines SGS0 to SGS3, respectively.

In the circuit configuration of the memory cell array 11, the bit line BL is shared by the NAND string NS to which the same column address is assigned in each string unit SU. The source line SL is shared among, for example, a plurality of blocks BLK.

A set of a plurality of memory cell transistors MT coupled to a common word line WL in one string unit SU is referred to as a cell unit CU. For example, the storage capacity of the cell unit CU including the memory cell transistors MT, each of which stores 1-bit data, is defined as "1 page data". The cell unit CU may have storage capacity of two pages or more data according to the number of bits of data stored in the memory cell transistors MT.

The memory controller 30 writes write data to the NAND device 10 having the above configuration in a predetermined write unit. The predetermined write unit is, for example, one page data or a plurality of page data. In other words, the predetermined write unit is, for example, a size corresponding to a plurality of memory cells coupled to one word line WL. However, the predetermined write unit may be set to a size different from the above example.

2. Configuration of Host Device 2

Next, returning to FIG. 1, the configuration of the host device 2 will be described. The host device 2 includes, for example, a host controller 40 and a host memory 50.

The host controller 40 may be implemented by a hardware processor such as a CPU executing an operating system. However, a part or all of the host controller 40 may be implemented by a circuit. The host controller 40 includes, for example, a command issuing unit 41 and a notification unit 42.

The command issuing unit 41 issues a command to the memory system 1. The command issuing unit 41 does not directly transmit the issued command to the memory system 1, but puts the issued command into a submission queue 51 (described later) in the host memory 50. The commands for the memory system 1 include a write command, a read command, a flush command, and the like.

The write command is a command requesting to write the write data to the memory system 1. The write command includes, for example, size information indicating the start address and data length of the region of the host data buffer 53 (described later) in which the write data is stored. The read command is a command requesting to read the read data from the memory system 1.

The flush command is a nonvolatile command requesting the NAND device 10 to write the data stored in the write buffer 21 when there is data stored in the write buffer 21. Even if the memory controller 30 does not receive a flush command in normal processing, when the amount of data accumulated in the write buffer 21 reaches the predetermined write unit, the memory controller 30 collectively writes those data to the NAND device 10. In at least one embodiment, the "normal processing" means processing when the pre-read regarding the submission queue 51, which will be described later, is not performed. On the other hand, even when data of the predetermined write unit is not accumulated in the write buffer 21, the flush command is a command for writing the data accumulated in the write buffer 21 in the NAND device 10. The flush command is issued by the command issuing unit 41 at a predetermined timing set in advance.

When the command issued by the command issuing unit 41 is input to the submission queue 51, the notification unit 42 transmits a notification indicating that a new command has been input to the submission queue 51 to the memory controller 30. This notification will be described in detail later.

The host memory 50 includes, for example, a DRAM provided in the host device 2. The host memory 50 includes, for example, the submission queue 51, a completion queue 52, and a host data buffer 53.

The submission queue 51 is a command queue that stores the operations that the host device 2 causes the memory system 1 to execute in the form of a so-called queue. The submission queue 51 has a specific slot size, and the commands issued by the command issuing unit 41 are stored in the order in which the commands are issued. The submission queue 51 is an example of a queue provided outside the memory system 1. The submission queue 51 is accessible to the memory controller 30. The commands stored in the submission queue 51 are sequentially fetched by the memory controller 30. The submission queue 51 will be described in detail later.

The completion queue 52 is a response queue for the host device 2 to receive a status notification regarding the completed command. The completion queue 52 has a specific slot size and stores the notification issued by the memory controller 30.

The host data buffer 53 is a storage region used for transferring data between the host controller 40 and the memory system 1. The host data buffer 53 temporarily stores write data and the like corresponding to the write command issued by the command issuing unit 41.

FIG. 4 is a diagram illustrating an example of an address map of the submission queue 51. For example, the submission queue 51 includes eight entries (SQ #0 to SQ #7), each of which is a region in which a command can be stored. In this case, the submission queue 51 can store up to eight commands simultaneously. Each of the eight entries in the submission queue 51 is assigned a unique address. The address assigned to the entry in the submission queue 51 is notified to the memory controller 30. Therefore, the memory controller 30 can read the command stored in the specific entry in the submission queue 51 at any timing by designating the above address. An example of the submission queue 51 is a submission queue that conforms to the NVMe standard.

FIG. 5 is a diagram illustrating an example of a command storage state of the submission queue 51. In the example illustrated in FIG. 5, four commands are accumulated in the submission queue 51, and four entries (SQ #0 to SQ #3) in the submission queue 51 are filled. In this case, the notification unit 42 of the host controller 40 notifies the memory controller 30 of information (information indicates the position of "Tail") indicating an entry (SQ #4) having the smallest number among empty entries (SQ #4 to SQ #7). As a result, the memory controller 30 can recognize the number of commands stored in the submission queue 51.

3. Configuration of Memory Controller

Figure 6:
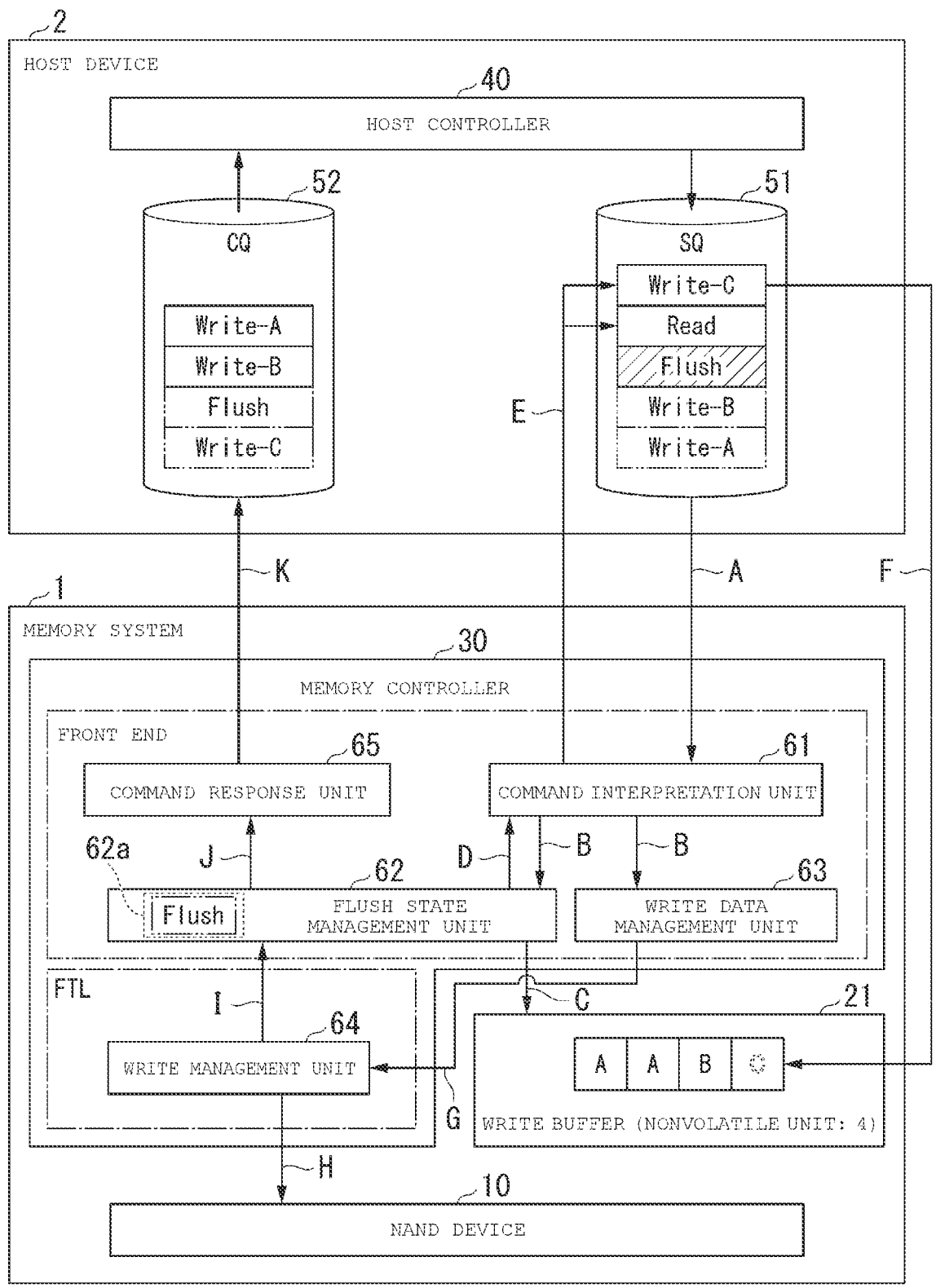
FIG. 6 is a block diagram illustrating a partial configuration of the memory system according to the first embodiment.

Next, the configuration of the memory controller 30 will be described. FIG. 6 is a block diagram illustrating a partial configuration of the memory system 1. FIG. 6 illustrates an example in which one write unit for the NAND device 10 is configured as four units of data for convenience of explanation. Further, FIG. 6 illustrates the state that a write command A (Write-A), a write command B (Write-B), a flush command (Flush), a read command (Read), and a write command C (Write-C) are sequentially stored in the submission queue 51, and then the write command A (Write-A), the write command B (Write-B) are fetched, and the flush command (Flush), the read command (Read), and the write command C (Write-C) are not fetched from the submission queue 51.

The memory controller 30 includes, for example, a command interpretation unit 61, a flush state management unit 62, a write data management unit 63, a write management unit 64, and a command response unit 65. In at least one embodiment, the command interpretation unit 61, the flush state management unit 62, the write data management unit 63, and the write management unit 64 are provided in the front end of the memory controller 30. The front end is implemented, for example, by a host I/F 33 or a combination of the host I/F 33 and the CPU 31. On the other hand, the command response unit 65 is provided in a flash translation layer (FTL). FTL is implemented, for example, by the CPU 31, or a combination of the CPU 31 and a circuit in the memory controller 30.

The command interpretation unit 61 acquires the command stored in the submission queue 51 by fetching the command stored in the submission queue 51 (see arrow A in FIG. 6). The command interpretation unit 61 interprets the content of the acquired command by decoding the command acquired from the submission queue 51. The interpretation of the command includes determining the type of command. Further, when the acquired command is a write command, the interpretation of the command includes measuring the capacity (size) of the write data corresponding to the write command. As described above, the write command includes size information indicating the data length of the write data. The command interpretation unit 61 measures the capacity of write data based on, for example, the size information included in the write command. The command interpretation unit 61 outputs the information obtained by interpreting the command to the flush state management unit 62 and the write data management unit 63 (see arrow B in FIG. 6).

In the normal processing, the command interpretation unit 61 fetches the commands stored in the submission queue 51 in the order in which the commands are stored in the submission queue 51. As a result, in the normal processing, the memory controller 30 executes the commands stored in the submission queue 51 in the order in which the commands are stored in the submission queue 51. In the example illustrated in FIG. 6, the command interpretation unit 61 fetches the write command A, the write command B, and the flush command stored in the submission queue 51 in this order.

In at least one embodiment, the command interpretation unit 61 scans the submission queue 51 to pre-read the submission queue 51. "Pre-read" means to detect one or more commands (subsequent commands) stored in the submission queue 51 after the unprocessed commands stored in the submission queue 51. Here, the unprocessed command refers to a command that is not executed by the memory controller 30. For example, if the command fetched from the submission queue 51 by the command interpretation unit 61 is a flush command and the memory controller 30 has not executed the processing of writing the data stored in the write buffer 21 into the NAND device 10, the fetched flush command is an unprocessed command. Further, "pre-read" may be processing of fetching and acquiring one or more commands (subsequent commands) stored in the submission queue 51 after the unprocessed commands stored in the submission queue 51. In the example illustrated in FIG. 6, the read command and the write command C are detected as subsequent commands following the flush command by pre-reading the submission queue 51.

In the at least one embodiment, in a state where write data not satisfying the predetermined write unit is stored in the write buffer 21, when the command received (for example, fetched command) from the submission queue 51 is a flush command, the command interpretation unit 61 pre-reads one or more subsequent commands stored in the submission queue 51 after the flush command.

Then, the command interpretation unit 61 interprets the contents of a pre-read command by decoding the command detected by pre-reading. That is, the command interpretation unit 61 determines the type of the pre-read command. Further, when the pre-read one or more commands include a write command, the command interpretation unit 61 measures the capacity of write data corresponding to the pre-read write command. The command interpretation unit 61 outputs the information obtained by pre-reading the submission queue 51 to the flush state management unit 62 and the write data management unit 63.

The flush state management unit 62 manages the processing regarding the flush command of the memory system 1. In at least one embodiment, when the command received from the submission queue 51 by the command interpretation unit 61 is a flush command, the flush state management unit 62 measures the amount of write data stored in the write buffer 21 (see arrow C in FIG. 6). That is, the flush state management unit 62 determines whether or not the size of the write data stored in the write buffer 21 has reached a predetermined write unit. In the example illustrated in FIG. 6, two units of data A and one unit of data B are stored in the write buffer 21, and one unit of data is insufficient up to the predetermined write unit. The sum of 2 units of data A and 1 unit of data B is an example of "first data." Hereinafter, for convenience of explanation, the fact that the size of the write data stored in the write buffer 21 is smaller than the predetermined write unit is sometimes referred to as "write data does not satisfy the predetermined write unit," and the fact that the size of the write data stored in the write buffer 21 has reached the predetermined write unit is sometimes referred to as "write data satisfies the predetermined write unit."

In a state where write data not satisfying the predetermined write unit is stored in the write buffer 21, when the command received from the submission queue 51 by the command interpretation unit 61 is a flush command, the flush state management unit 62 stores the flush command and information indicating the amount of write data stored in the write buffer 21 in a RAM 62a within the flush state management unit 62. In addition, the flush state management unit 62 outputs a pre-read request (hereinafter, referred to as "SQ pre-read request") instructing the pre-reading of the submission queue 51 to the command interpretation unit 61 (see arrow D in FIG. 6). As a result, the command interpretation unit 61 pre-reads the submission queue 51 described above (see arrow E in FIG. 6).

The write data management unit 63 stores the write data received from the host device 2 in response to the write command in the write buffer 21 in the DRAM 20. In at least one embodiment, when a write command is included in the subsequent command pre-read by the command interpretation unit 61, the write data management unit 63 outputs a request to the host controller 40 to transfer the write data stored in the host data buffer 53 corresponding to the write command (hereinafter, referred to as "pre-read write command") to the write buffer 21 of the memory system 1.

As a result, the write data management unit 63 stores the write data corresponding to the pre-read write command in the write buffer 21 (see arrow F in FIG. 6). In the example illustrated in FIG. 6, one unit of data C, which is the write data corresponding to the pre-read write command C, is stored in the write buffer 21. As a result, the size of the write data stored in the write buffer 21 reaches the predetermined write unit. Data C is an example of "second data". When the size of the write data stored in the write buffer 21 reaches the predetermined write unit, the write data management unit 63 outputs a notification (hereinafter, referred to as "buffer full notification") indicating that the size of the write data stored in the write buffer 21 has reached the predetermined write unit to the write management unit 64 (see arrow G in FIG. 6).

When receiving a buffer full notification, the write management unit 64 collectively writes the data satisfying the predetermined write unit stored in the write buffer 21 to the NAND device 10 via the NAND I/F 34. In the example illustrated in FIG. 6, the write management unit 64 writes 2 units of data A, 1 unit of data B, and 1 unit of data C to the NAND device 10 as data satisfying the predetermined write unit (see arrow H in FIG. 6). That is, in the example illustrated in FIG. 6, the write management unit 64 simultaneously writes 2 units of data A, 1 unit of data B, and 1 unit of data C to the NAND device 10.

The write management unit 64 performs a write operation of collectively writing data satisfying the predetermined write unit to the NAND device 10, and then outputs a notification indicating the result to the flush state management unit 62 (see arrow I in FIG. 6). When receiving a notification from the write management unit 64 indicating an appropriate result of the write operation, the flush state management unit 62 outputs a notification indicating that the processing of the write commands A, B, and C has been completed and that the processing of the flush command has been completed to the command response unit 65 (see arrow J in FIG. 6).

On the other hand, when the size of the write data stored in the write buffer 21 does not reach the predetermined write unit even when the submission queue 51 is pre-read, the write management unit 64 executes processing in accordance with the flush command. That is, the write management unit 64 writes only the data stored in the write buffer 21 to the NAND device 10 via the NAND I/F 34. In this case, a write operation including padding the padding data is performed on the NAND device 10. The "padding data" is data having no meaning to be written, corresponding to the insufficient size when the size of the write data does not reach the predetermined write unit.

When receiving a notification from the flush state management unit 62 indicating that the command processing has been completed, the command response unit 65 inputs a status notification regarding the completed command to the completion queue 52 (see arrow K in FIG. 6). In the example illustrated in FIG. 6, the command response unit 65 inputs a notification indicating that the processing of the write command C has been completed and the processing of the flush command has been completed to the completion queue 52. As a result, the host device 2 can recognize that the command processing has been completed.

4. Operation

Figure 7:
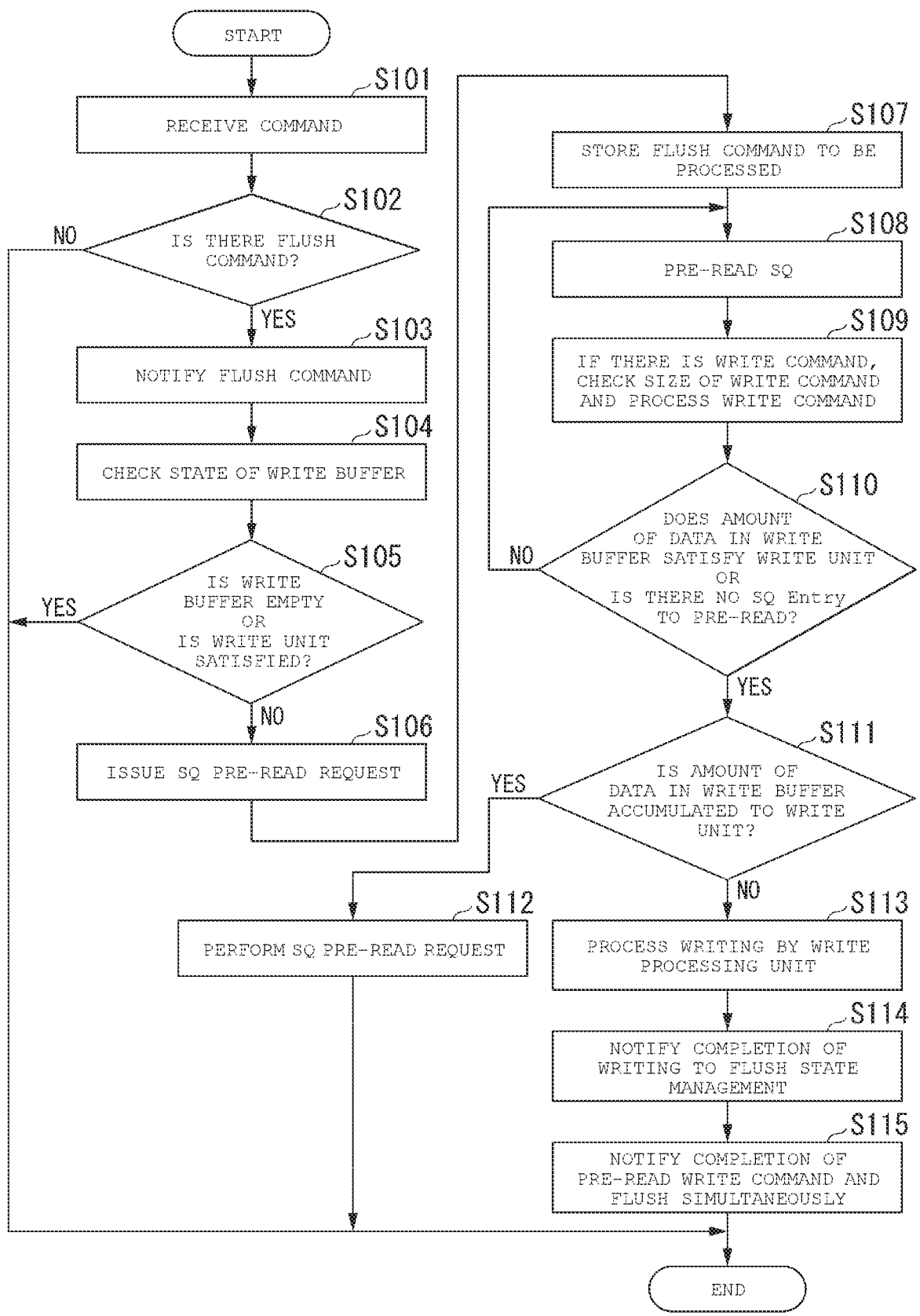
FIG. 7 is a flowchart illustrating an operation flow of a memory controller according to the first embodiment.

FIG. 7 is a flowchart illustrating an operation flow of the memory controller 30 according to the first embodiment.

First, the command interpretation unit 61 receives a command from the submission queue 51 by fetching the command from the submission queue 51 (S101). Then, the command interpretation unit 61 determines whether or not the command received from the submission queue 51 is a flush command (S102). If the command received from the submission queue 51 is not a flush command (S102: NO), the memory controller 30 continues the normal processing. That is, the memory controller 30 receives the commands stored in the submission queue 51 in the order in which the commands are stored and executes the processing in accordance with the received commands sequentially.

On the other hand, when the command received from the submission queue 51 is a flush command (S102: YES), the command interpretation unit 61 notifies the flush state management unit 62 of information indicating the flush command received from the submission queue 51 (S103). In this case, the flush state management unit 62 measures the amount of write data stored in the write buffer 21 (S104).

When the write buffer 21 is empty or write data satisfying the predetermined write unit is stored in the write buffer 21 (S105: YES) as a result of detection by the processing of S104, it is out of the scope of this flow. In this case, as a part of the normal processing, the memory controller 30 receives the commands stored in the submission queue 51 in the order in which the commands are stored and sequentially executes the processing in accordance with the received commands.

On the other hand, when the write buffer 21 is not empty and data not satisfying the predetermined write unit is stored in the write buffer 21 (S105: NO), the flush state management unit 62 notifies an SQ pre-read request to the command interpretation unit 61 (S106). Further, the flush state management unit 62 stores a flush command to be processed (S107).

When receiving the SQ pre-read request from the flush state management unit 62, the command interpretation unit 61 pre-reads the submission queue 51 (S108). That is, the command interpretation unit 61 detects whether or not a write command is included in one or more subsequent commands following the flush command, in the submission queue 51. When the presence of a write command is detected as a result of pre-reading the submission queue 51, the command interpretation unit 61 measures the capacity (size) of write data corresponding to the pre-read write command and notifies the write data management unit 63 of the pre-read write command as a command to be processed (S109). In response to this notification, the write data management unit 63 stores the write data corresponding to the pre-read write command in the write buffer 21.

Next, the flush state management unit 62 detects whether the amount of data stored in the write buffer 21 has been accumulated up to the predetermined write unit, and whether there is no entry to be pre-read in the submission queue 51 (S110). When the amount of data stored in the write buffer 21 has not yet been accumulated up to the predetermined write unit, and there is still an entry to be pre-read in the submission queue (S110: NO), the flush state management unit 62 repeats processing of S110 from S108. On the other hand, when the data amount of the write buffer 21 is accumulated up to the predetermined write unit or there is no entry to be pre-read in the submission queue 51 (S110: YES), the flush state management unit 62 proceeds to processing of S111.

After the processing of S110 is completed, the flush state management unit 62 determines whether or not the amount of data in the write buffer 21 has been accumulated up to the predetermined write unit (S111). When the amount of data in the write buffer 21 is not accumulated up to the predetermined write unit (S111: NO), the flush state management unit 62 executes the processing of a flush command (S112). That is, the write operation including padding the padding data is performed on the NAND device 10.

On the other hand, when the amount of data in the write buffer 21 is accumulated up to the predetermined write unit (S111: YES), the write management unit 64 executes processing of collectively writing the data in the write unit to the NAND device (S113). Next, the write management unit 64 outputs a notification indicating that the writing has been completed to the flush state management unit 62 (S114). Next, the command response unit 65 inputs the completion notification of the flush command processing and the completion notification of the pre-read write command processing to the completion queue 52 of the host device 2 simultaneously (S115). As a result, a series of processes is completed.

Figure 8:
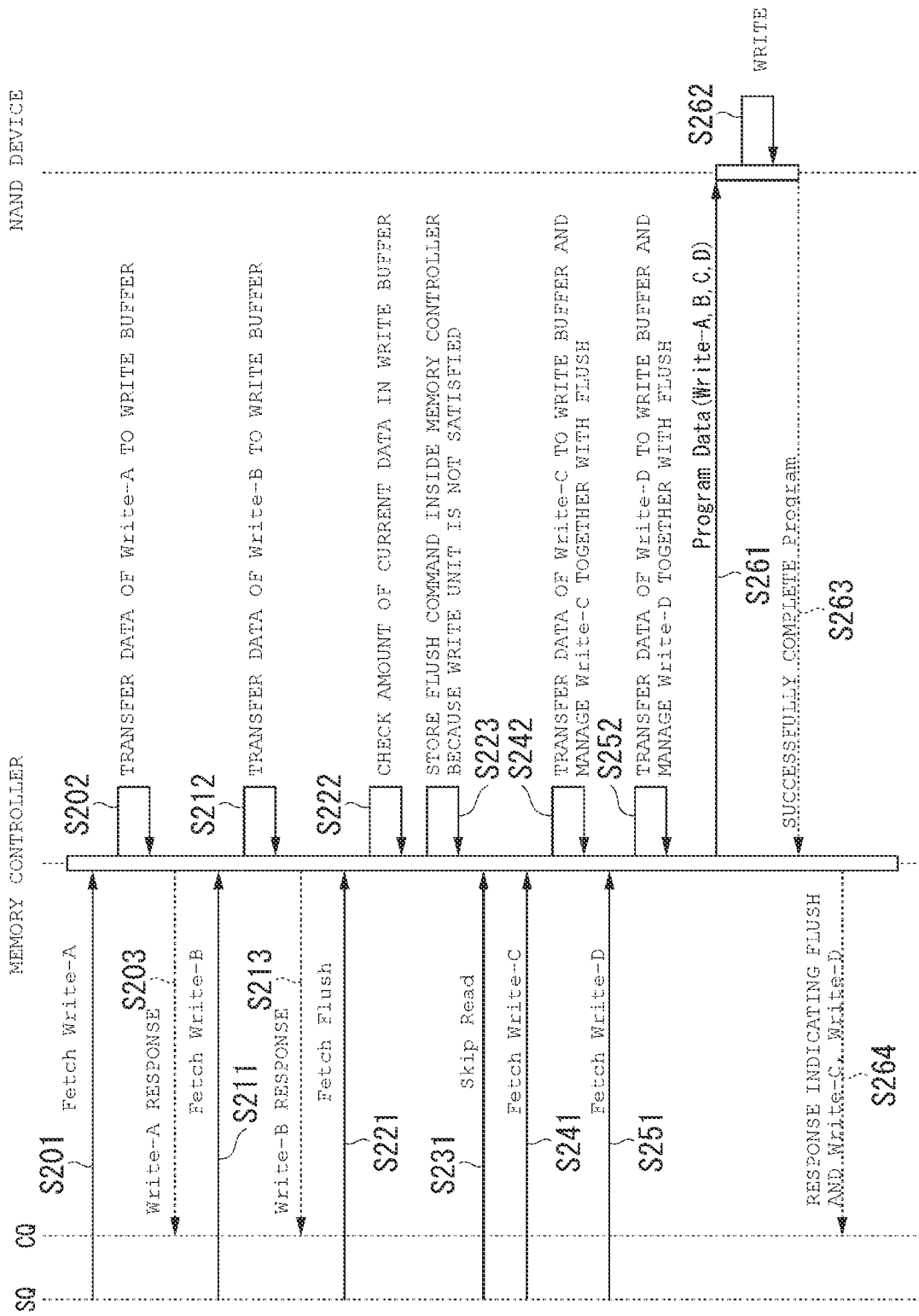
FIG. 8 is a sequence diagram illustrating an example of the operation flow of the memory controller according to the first embodiment.

FIG. 8 is a sequence diagram illustrating an example of the operation flow of the memory controller 30 according to the first embodiment. FIG. 8 illustrates an example of a case where a write command A (Write-A), a write command B (Write-B), a flush command (Flush), a read command (Read), a write command C (write-C), and a write command D (write-D) are stored in this order in the submission queue 51. The write data corresponding to the write commands A, B, C, and D is one unit of data. The write command C is an example of a "first write command". The write command D is an example of a "second write command". The data C corresponding to the write command C is an example of the "first write data" and an example of "second data". The data D corresponding to the write command D is an example of "second write data" and an example of "third data".

First, the command interpretation unit 61 fetches the write command A from the submission queue 51 (S201). In this case, the write data management unit 63 stores the data A corresponding to the write command A in the write buffer 21 (S202). The command response unit 65 inputs a response indicating that the processing of the write command A is completed to the completion queue 52 (S203).

Next, the command interpretation unit 61 fetches the write command B from the submission queue 51 (S211). In this case, the write data management unit 63 stores the data B corresponding to the write command B in the write buffer 21 (S212). The command response unit 65 inputs a response indicating that the processing of the write command B is completed to the completion queue 52 (S213).

Next, the command interpretation unit 61 fetches the flush command from the submission queue 51 (S221). In this case, the flush state management unit 62 measures the amount of current data stored in the write buffer 21 (S222). In the example illustrated in FIG. 7, the flush state management unit 62 stores a flush command because the amount of current data stored in the write buffer 21 does not satisfy the predetermined write unit (S223).

Next, the command interpretation unit 61 pre-reads the submission queue 51. In this example, the submission queue 51 stores a read command as a next command. When the command detected by pre-reading is a read command, the command interpretation unit 61 skips the read command without processing the read command (S231). When the command detected by pre-reading is a read command, the command interpretation unit 61 may execute the read operation corresponding to the read command without skipping the read command, and then perform the processing after S241.

Next, the command interpretation unit 61 pre-reads the submission queue 51 again. In this example, the write command C is stored in the submission queue 51 as the next command. In this case, the command interpretation unit 61 fetches the write command C detected by pre-reading (S241). In this case, the write data management unit 63 stores the data C corresponding to the write command C in the write buffer 21 and stores the write command C in the flush state management unit 62 (S242).

Next, the command interpretation unit 61 pre-reads the submission queue 51 again. In this example, the write command D is stored in the submission queue 51 as a next command. In this case, the command interpretation unit 61 fetches the write command D detected by pre-reading (S251). In this case, the write data management unit 63 stores the data D corresponding to the write command D in the write buffer 21 and stores the write command D in the flush state management unit 62 (S252). By the above processing, the size of the write data stored in the write buffer 21 reaches the predetermined write unit.

The write management unit 64 transfers the data A, B, C, and D stored in the write buffer 21 to the NAND device 10 (S261) and simultaneously writes the data A, B, C, and D to the NAND device 10 (S262). When the normal processing is completed, the NAND device 10 notifies the write management unit 64 of the notification indicating the completion of writing (S263). In this case, the command response unit 65 inputs a response indicating that the processing of the flush command and the processing of the write commands C and D have been completed to the completion queue 52 (S264). As a result, the flush command processing with 100% valid data rate is performed.

5. Advantages

The memory controller may receive a predetermined command (for example, a flush command) for writing the first data to the NANA device in a state where the first data not satisfying the write unit is stored in the write buffer. In order for the first data to be written to the nonvolatile memory in a state where the write unit is not satisfied, processing of writing the padding data simultaneously occurs. As a result, the write efficiency (Write Application Factor: WAF) is decreased, and the reliability of the memory system may be decreased in the long term.

On the other hand, in at least one embodiment, when receiving a predetermined command for writing the first data to the NAND device 10 in a state where the first data that does not satisfy the write unit is stored in the write buffer, the memory controller 30 writes the first data and second data acquired from the host device 2 to the NAND device 10 at the same time. As a result, it is possible to prevent a decrease in write efficiency and improve the reliability of the memory system.

In at least one t embodiment, when receiving a predetermined command from the submission queue 51, the memory controller 30 pre-reads one or more subsequent commands stored in the submission queue 51 after the predetermined command, and if one or more subsequent commands include a write command, writes the write data corresponding to the write command to the NAND device 10 as second data. According to such an arrangement, it is possible to prevent a decrease in write efficiency by using the write data corresponding to the subsequent write command. In addition, since the write data corresponding to the subsequent write command is also written in the NAND device 10, it also contributes to the improvement of the processing speed.

In at least one embodiment, in response to writing the write data corresponding to the subsequent write command to the NAND device 10 as second data, the memory controller 30 outputs a response indicating that processing of the predetermined command and the write command has been completed to the host device 2. With such a configuration, the host device 2 can appropriately recognize that the processing of the predetermined command and the write command has been completed.

6. Modification Example

Figure 9:
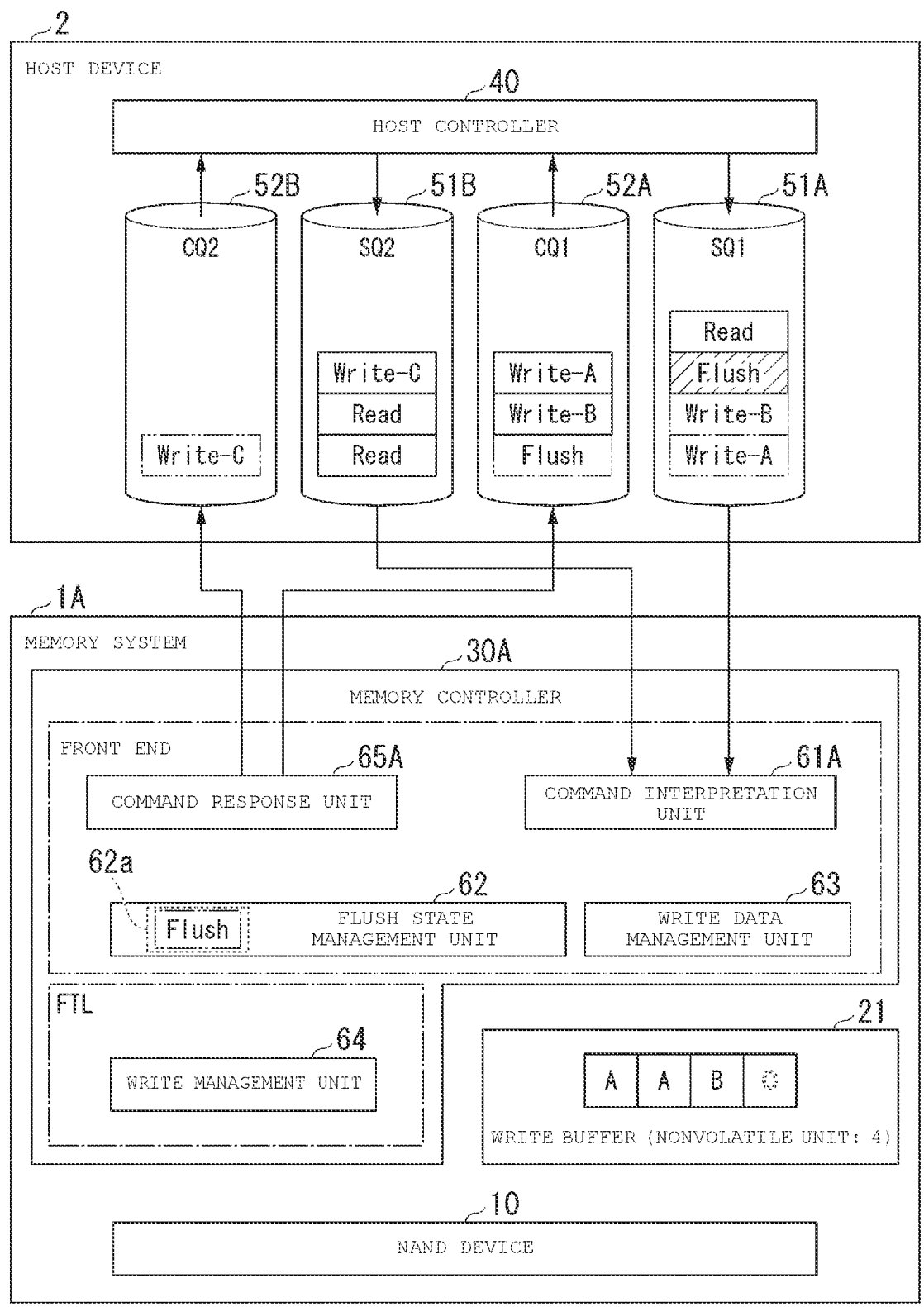
FIG. 9 is a block diagram illustrating a partial configuration of a memory system according to a modification example of the first embodiment.

FIG. 9 is a block diagram illustrating a part of a memory system 1A according to a modification example of the first embodiment. In the present modification example, the host memory 50 includes, for example, a first submission queue 51A and a second submission queue 51B as a plurality of submission queues corresponding to a plurality of cores configured to operate in parallel. Similarly, the host memory 50 includes a first completion queue 52A and a second completion queue 52B as a plurality of completion queues corresponding to a plurality of cores configured to operate in parallel.

Commands issued by the processors in a first core are sequentially input to the first submission queue 51A. Commands issued by the processors in a second core are sequentially input to the second submission queue 51B. The first submission queue 51A is an example of a "first queue". The second submission queue 51B is an example of a "second queue".

In the present modification example, when the command received from either the first submission queue 51A or the second submission queue 51B is a flush command, the command interpretation unit 61A of the memory controller 30A pre-reads both the first and second submission queues 51A and 51B. Then, if there is a subsequent or unprocessed write command in either the first submission queue 51A or the second submission queue 51B, the write management unit 64 writes write data corresponding to the write command and write data stored in the write buffer 21 to the NAND device 10 at the same time. Further, in the present modification example, when the command processing has been completed, a command response unit 65A inputs a response to the command received from the first submission queue 51A to the first completion queue 52A and inputs a response to the command received from the second submission queue 51B to the second completion queue 52B.

According to such a configuration, the probability that a write command is found can be increased by pre-reading a plurality of submission queues 51. As a result, the decrease in write efficiency can be further prevented, and the reliability of the memory system 1A can be further improved.

Second Embodiment

Next, a second embodiment will be described. The second embodiment is different from the first embodiment in that when a flush command is received from the submission queue 51, write data and the data (hereinafter, referred to as "internal data") in accordance with the internal processing of the memory system 1B are written in the NAND device 10 at the same time. The configuration other than that described below is the same as the configuration of the first embodiment.

Figure 10:
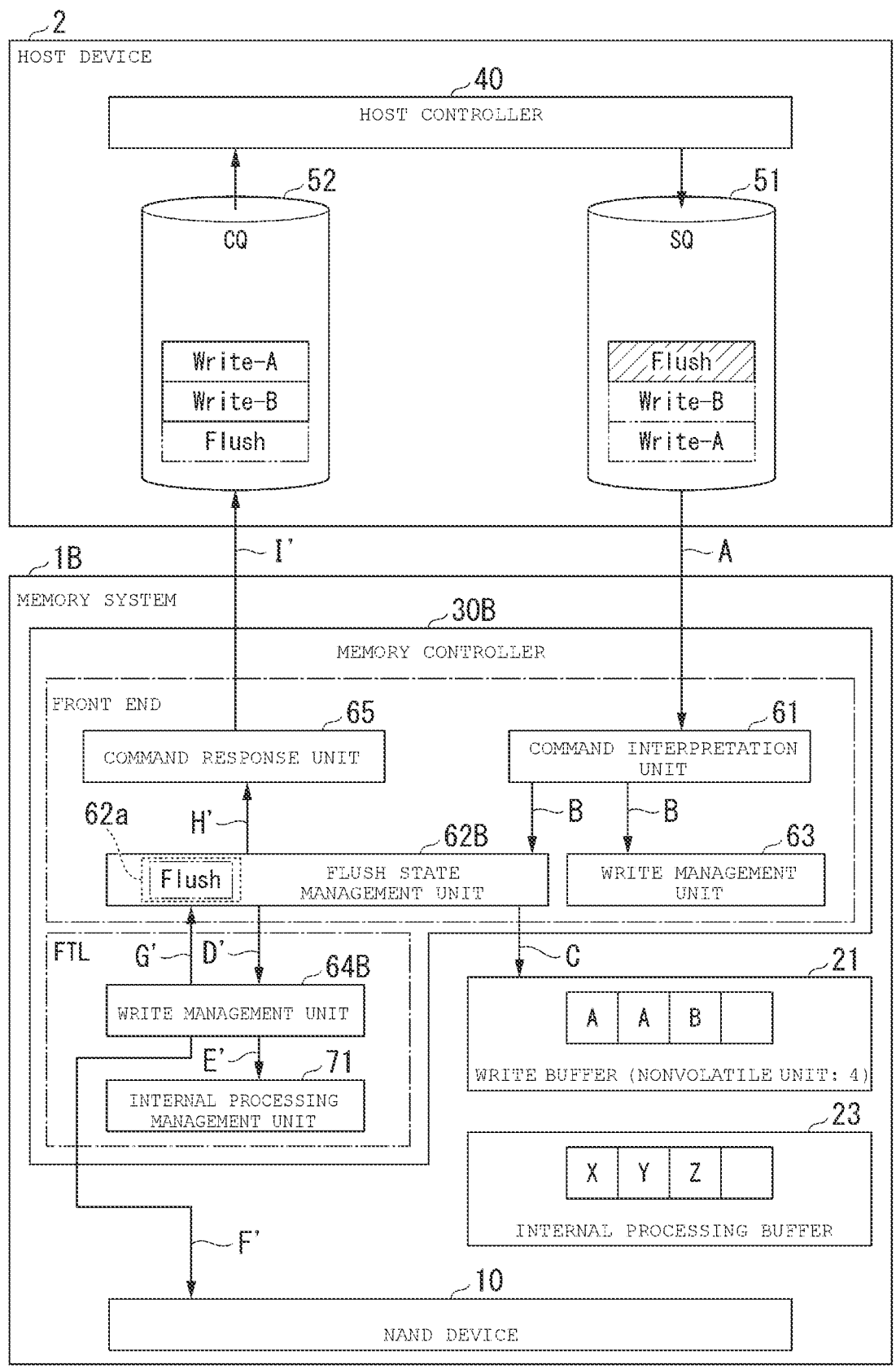
FIG. 10 is a block diagram illustrating a partial configuration of a memory system according to a second embodiment.

FIG. 10 is a block diagram illustrating a part of the memory system 1B according to the second embodiment. In at least one embodiment, the DRAM 20 includes an internal processing buffer 23 in addition to the write buffer 21 and the read buffer 22 (see FIG. 1). The internal processing buffer 23 temporarily stores internal data moved in the memory system 1B in accordance with the internal processing of the memory system 1B. The internal processing is executed, for example, by the CPU 31, or a combination of the CPU 31 and the circuit in the memory controller 30. For example, the internal data is data that has been written to a nonvolatile memory M, and is data read from the nonvolatile memory M and scheduled to be written again in the nonvolatile memory M. The internal processing buffer 23 is an example of "a predetermined region of volatile memory different from the write buffer". The internal data is an example of "data to be written". The internal processing of the memory system 1B is, for example, garbage collection, compaction, refresh, or wear leveling.

Garbage collection is the processing of increasing the number of free blocks of the NAND device 10. A "free block" is a block in which valid data is not stored and new data can be written by undergoing an erasing operation. For example, garbage collection is the processing of copying at least the valid data from a plurality of blocks BLK (movement source block BLK) that store the valid data and the invalid data to other blocks BLK (destination block BLK) having the number smaller than the number of movement source blocks BLK and invalidating the data of the plurality of movement source blocks BLK. When garbage collection is executed, the valid data read from a movement source block BLK is stored in the internal processing buffer 23 as an example of the internal data. Here, the "valid data" is the data referenced from the look-up table (that is, data associated with a logical address). The valid data is data that may be later read by the host device 2. On the other hand, "invalid data" is data that is not associated with any logical address. The invalid data is data that can no longer be read from the host device 2. Also, when garbage collection is executed, padding data is treated as data similar to invalid data.

Compaction is the process of increasing a continuous free area in the NAND device 10. For example, compaction is the process of copying the data read from a plurality of non-consecutive blocks BLK (movement source block BLK) to a plurality of consecutive blocks BLK (destination block BLK) and using the data of the plurality of movement source blocks BLK as a free area. When the compaction can be executed, the data read from the movement source block BLK is stored in the internal processing buffer 23 as an example of the internal data. Compaction may be performed as part of garbage collection.

Refresh is the process of reading data once from the NAND device 10 and rewriting the read data to the NAND device 10 in order to reduce deterioration of the data stored in the NAND device 10. When refresh can be executed, the data to be refreshed read from the NAND device 10 is stored in the internal processing buffer 23 as an example of the internal data.

Wear leveling is the process of reading data from the block BLK (movement source block BLK) that stores the data and rewriting the read data to another block BLK in the same NAND device 10 or to another NAND device 10 in order to extend the service lifetime of the NAND device 10. When wear leveling is executed, the data read from the movement source block BLK is stored in the internal processing buffer 23 as an example of the internal data.

As illustrated in FIG. 10, the FTL of the memory controller 30B of at least one embodiment includes an internal processing management unit 71 in addition to a write management unit 64B. The internal processing management unit 71 manages the internal processing of the memory system 1B. For example, the internal processing management unit 71 manages processes such as garbage collection, compaction, refreshing, and wear leveling described above.

In at least one embodiment, when the command received from the submission queue 51 by the command interpretation unit 61 is a flush command, the flush state management unit 62B measures the amount of write data stored in the write buffer 21 in the same way as the first embodiment (see arrow C in FIG. 10). That is, the flush state management unit 62B determines whether or not the write data satisfying the predetermined write unit is stored in the write buffer 21. In the example illustrated in FIG. 10, the write buffer 21 is in a situation where two units of data A and one unit of data B do not have enough one unit of data up to the predetermined write unit.

When the command interpretation unit 62B receives a flush command from the submission queue 51 in a state where write data not satisfying the predetermined write unit is stored in the write buffer 21, the flush state management unit 62B stores the flush command and information indicating the amount of write data stored in the write buffer 21 in the RAM 62a in the flush state management unit 62B. In addition, the flush state management unit 62B notifies the write management unit 64B of a request (hereinafter, referred to as "write request with data compensation") for simultaneously writing the write data (write data not satisfying the predetermined write unit) stored in the write buffer 21 and at least a part of the internal data stored in the internal processing buffer 23 to the NAND device 10 (see arrow D' in FIG. 10).

When receiving a write request with data compensation, the write management unit 64B notifies the internal processing management unit 71 of a request (hereinafter, "internal processing buffer confirmation request") for measuring the amount of internal data stored in the internal processing buffer 23 (see arrow E' in FIG. 10).

When receiving an internal processing buffer confirmation request, the internal processing management unit 71 measures the amount of internal data stored in the internal processing buffer 23. Then, the internal processing management unit 71 notifies the write management unit 64B of information indicating the amount of detected internal data.

When the internal data is stored in the internal processing buffer 23, the write management unit 64B simultaneously writes the write data stored in the write buffer 21 and the internal data in an amount corresponding to the insufficient write data for the predetermined write unit in the internal data stored in the internal processing buffer 23 to the NAND device 10 (see arrow F' in FIG. 10). In the example illustrated in FIG. 10, the write management unit 64B simultaneously writes two units of data A and one unit of data B stored in the write buffer 21 and 1 unit of data X stored in the internal processing buffer 23 to the NAND device 10.

The write management unit 64B performs a write operation of collectively writing data satisfying the predetermined write unit to the NAND device 10, and then outputs a notification indicating the result to the flush state management unit 62B (see arrow G' in FIG. 10). When receiving a notification indicating an appropriate result of the write operation from the write management unit 64B, the flush state management unit 62B outputs a notification indicating that the flush command processing has been completed to the command response unit 65 (see arrow H' in FIG. 10).

When receiving a notification from the flush state management unit 62B indicating that the command processing has been completed, the command response unit 65 inputs a status notification regarding the completed command to the completion queue 52 (see arrow I' in FIG. 10). As a result, the host device 2 can recognize that the command processing has been completed.

According to the configuration described above, reliability can be improved as in the first embodiment. For example, in at least one embodiment, when receiving a predetermined command from the submission queue 51, the memory controller 30B determines whether or not there is data to be written in the predetermined region of the DRAM 20, and when there is data to be written in the predetermined region of the DRAM 20, writes the data to be written to the NAND device 10 simultaneously with the write data stored in the write buffer 21. As a result, it is possible to prevent a decrease in write efficiency and improve the reliability of the memory system 1B.

The second embodiment may be combined with the first embodiment. That is, when the command interpretation unit 61 receives a flush command, the write management unit 64B may simultaneously write the write data (write data not satisfying write units) written in the write buffer 21, the write data obtained by pre-reading the submission queue 51, and the internal data obtained from the internal processing buffer 23 to the NAND device 10.

Third Embodiment

Next, a third embodiment will be described. The third embodiment is different from the first embodiment in that when a flush command is received from the submission queue 51, the write data written in the write buffer 21 and the data having similar attributes to the write data are written to the NAND device 10 simultaneously. The configuration other than that described below is the same as the configuration of the first embodiment or the second embodiment.

Figure 11:
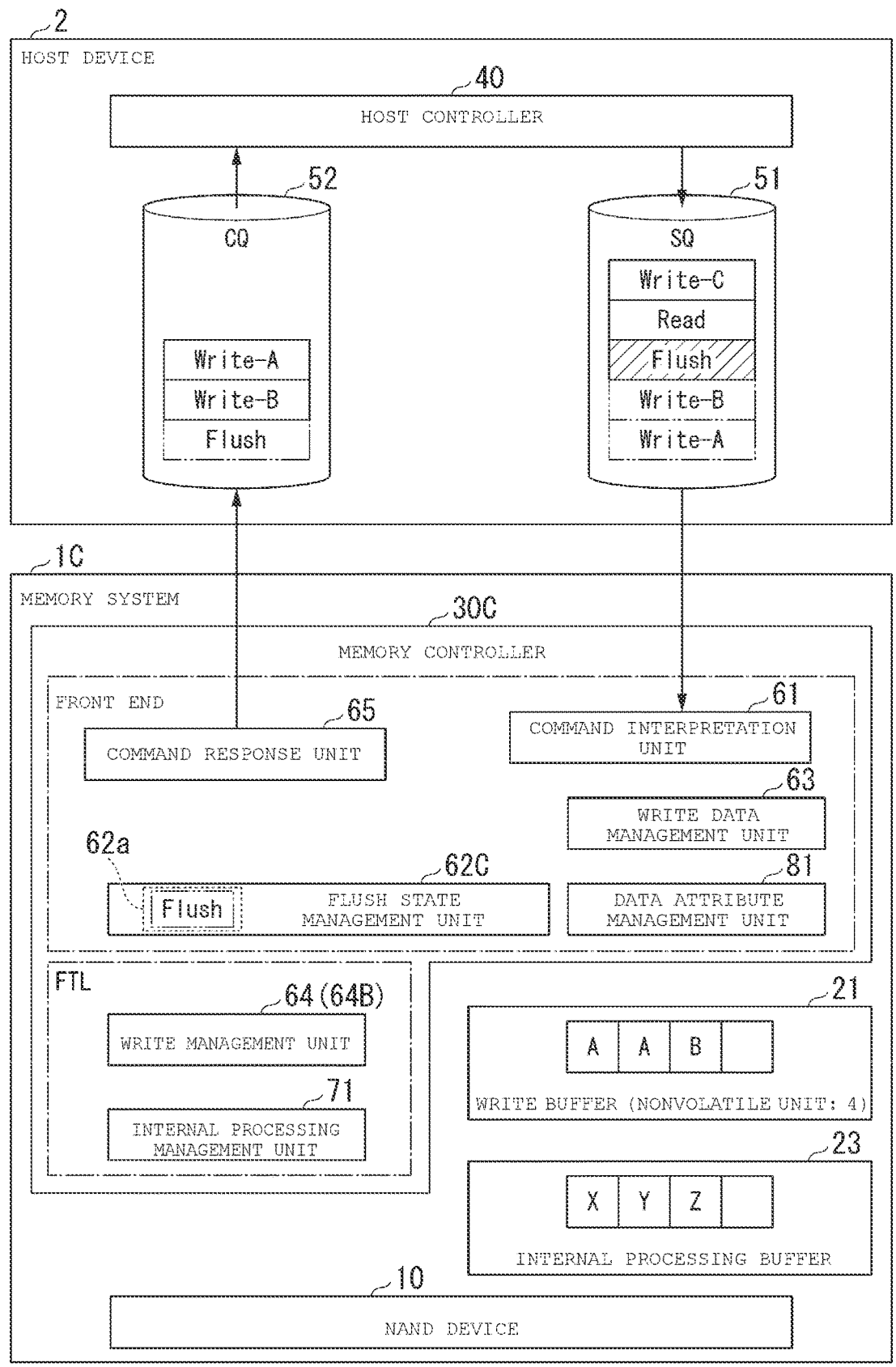
FIG. 11 is a block diagram illustrating a partial configuration of a memory system according to a third embodiment.

FIG. 11 is a block diagram illustrating a part of a memory system 1C according to the third embodiment. In at least one embodiment, a memory controller 30C includes a data attribute management unit 81 that manages data attributes. The data attribute management unit 81 may be provided as apart of a flush state management unit 62C, or may be provided separately from the flush state management unit 62C.

The data attribute management unit 81 manages each data in correlation with the attribute information indicating the attribute of each data. Such attribute information may be, for example, attribute information classified according to the access frequency for each data (so-called data temperature such as cold data or hot data), and may be attribute information given to each group set for each data or may be attribute information given depending on the kind of a command of which each data is written in the past.

The "attribute information given to each group set for each data" is, for example, an identifier (ID) collectively given to data having the same characteristics. The "attribute information given to each group set for each data" is, for example, a stream ID defined in the NVMe standard. The "attribute information given according to the type of a command of which each data is written in the past" is, for example, an identifier indicating whether or not the data has been written by processing a flush command in the past. Further, for write data, NVMe standard dataset management (DSM) may be used as attribute information.

In the embodiment, the data attribute management unit 81 determines whether or not the attribute information of two data satisfies a predetermined condition based on the attribute information described above. For example, when the difference in the access frequency between two data is within a predetermined range, the data attribute management unit 81 determines that the attribute information of the two data satisfies the predetermined condition. Similarly, when the difference between the identifiers given to two data is within a predetermined range, the data attribute management unit 81 determines that the attribute information of the two data satisfies the predetermined condition. Further, if two data have been written by the same write process (based on the processing of a flush command or not) in the past, the data attribute management unit 81 determines that the attribute information of the two data satisfies the predetermined condition.

In the at least one embodiment, only when it is determined that the attribute information correlated with the write data (write data not satisfying write units) written in the write buffer 21 and the attribute information correlated with the write data obtained by pre-reading the submission queue 51 satisfy the predetermined condition, the flush state management unit 62C simultaneously writes those data to the NAND device 10. Similarly, only when it is determined that the attribute information correlated with the write data (write data not satisfying write units) written in the write buffer 21 and the attribute information correlated with the internal data obtained from the internal processing buffer 23 satisfy the predetermined condition, the write management unit 64 simultaneously writes those data to the NAND device 10.

According to such a configuration, reliability can be improved as in the first embodiment. Here, if a plurality of data having different characteristics are collectively written to the NAND device 10, the write efficiency (WAF) may be lowered on the contrary.

Therefore, in at least one embodiment, only when the attribute information correlated with the first data stored in the write buffer 21 and the attribute information correlated with the second data acquired from the outside or inside of a memory system 1C satisfy a predetermined relationship, the memory controller 30C simultaneously writes the first data and the second data to the NAND device 10. According to such a configuration, it is possible to prevent a plurality of data having different characteristics from being written collectively to the NAND device 10. As a result, the decrease in write efficiency can be further prevented, and the reliability of the memory system 1C can be further improved.

According to at least one embodiment, for example, it is possible to prevent hot data and cold data from being written collectively to the NAND device 10. Also, the data previously written by a flush command is likely to be a log or journal. Even if these data are subject to internal processing (for example, compaction) of the memory system 1C, and even if these data are mixed with write data and written, it is unlikely to lead to a significant decrease in write efficiency. Therefore, in at least one embodiment, the data previously written by a flush command is written to the NAND device 10 simultaneously with the write data.

In place of/in addition to the above example, the flush state management unit 62C may select the data having a higher degree of similarity between the write data written in the write buffer 21 and the attribute information from the write data obtained by pre-reading the submission queue 51 and the internal data obtained from the internal processing buffer 23 as data to be written simultaneously with the write data written in the write buffer 21

Fourth Embodiment

Next, a fourth embodiment will be described. The fourth embodiment is different from the second embodiment in that when the submission queue 51 is pre-read in order to detect a flush command stored after an unprocessed command and a flush command is found by pre-reading the submission queue 51, the internal processing of the memory system 1D is accelerated preliminarily and internal data are stored in the internal processing buffer 23. The configuration other than that described below is the same as the configuration of the first embodiment or the second embodiment.

Figure 12:
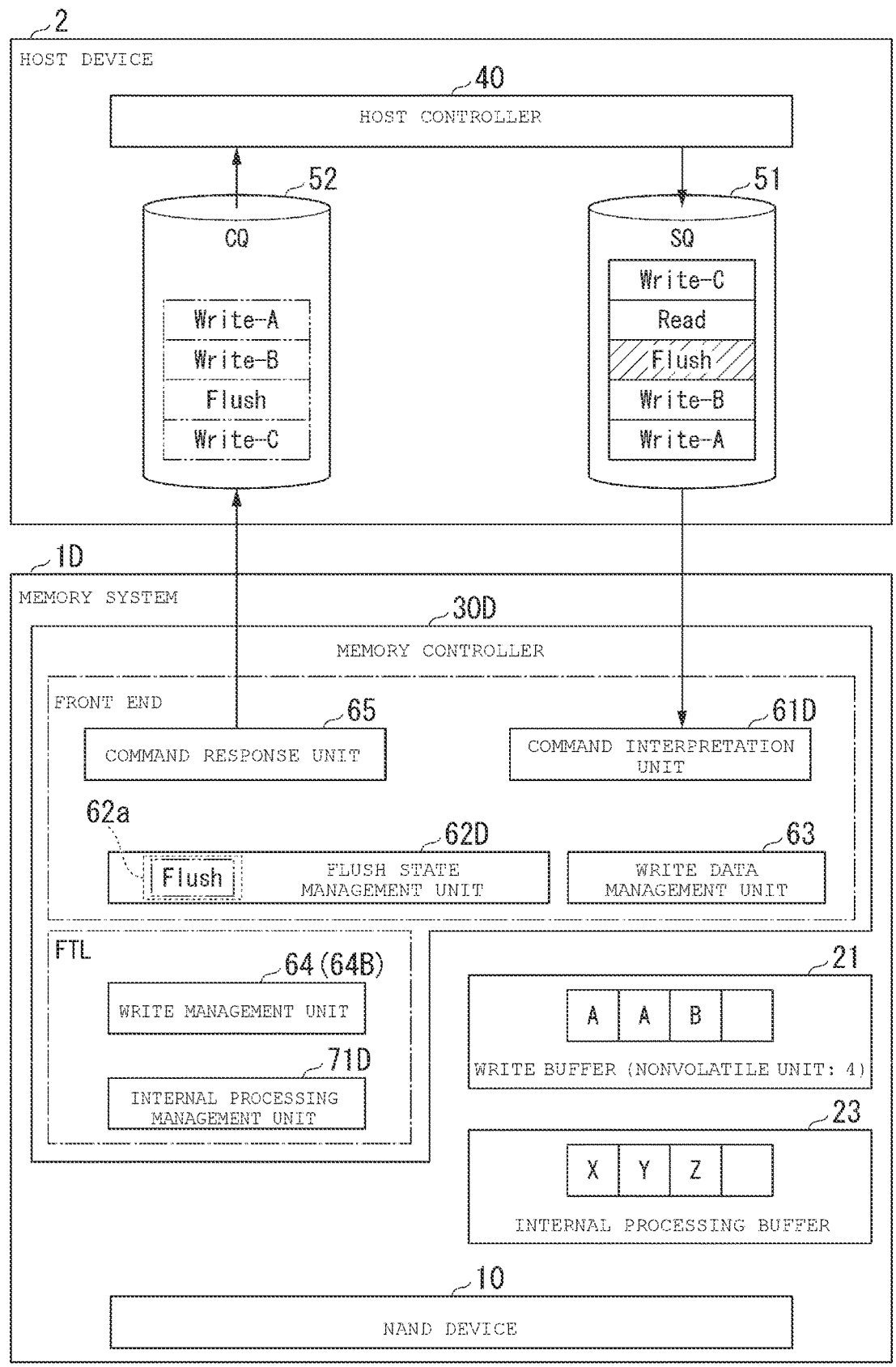
FIG. 12 is a block diagram illustrating a partial configuration of a memory system according to a fourth embodiment.

FIG. 12 is a block diagram illustrating a part of the memory system 1D according to the fourth embodiment. In at least one embodiment, the command interpretation unit 61D of the memory controller 30D pre-reads the submission queue 51 in order to determine whether or not there is a flush command in the submission queue 51 at a predetermined timing (for example, a fixed cycle). The example illustrated in FIG. 12 illustrates the case where a flush command is found by pre-reading the submission queue 51 before the write commands A and B, which are precedent commands previously stored in the submission queue 51, are fetched. When a flush command is found by pre-reading the submission queue 51, the command interpretation unit 61D outputs a notification indicating that there is a flush command (hereinafter, referred to as "flush command detection notification") to the flush state management unit 62D.

In at least one embodiment, when receiving a flush command detection notification, the flush state management unit 62D measures the amount of write data stored in the write buffer 21 and the amount of internal data stored in the internal processing buffer 23. Further, when there is one or more write commands detected by pre-reading the submission queue 51, the flush state management unit 62D measures the amount of write data corresponding to the one or more write commands. Then, the flush state management unit 62D determines whether or not the total amount of the combined data satisfies the predetermined write units. When the total amount of the above data does not satisfy the predetermined write unit, the flush state management unit 62D notifies an internal processing management unit 71D of a request (hereinafter, referred to as "internal processing acceleration request") for accelerating the internal processing of the memory system 1D.

When receiving an internal processing acceleration request, the internal processing management unit 71D changes a threshold value regarding the execution of internal processing and accelerates the execution of the internal processing. The internal processing management unit 71D increases the amount of internal data stored in the internal processing buffer 23 by, for example, increasing or advancing processing such as garbage collection, compaction, refreshing, or wear leveling. That is, the internal processing management unit 71D reads the internal data from the NAND device 10 and starts processing of moving the data to the internal processing buffer 23 before or during the execution of the precedent commands (write commands A and B in the example illustrated in FIG. 12) stored in the submission queue prior to the flush command. The "threshold value regarding execution of internal processing" is, for example, an index for adjusting the amount of data when copying data to the internal processing buffer 23 in garbage collection.

According to such a configuration, the internal processing of the memory system 1D is accelerated before the command interpretation unit 61D actually fetches the flush command, and a larger amount of internal data is likely to be stored in the internal processing buffer 23. As a result, data satisfying the predetermined write unit can be easily aligned before the command interpretation unit 61D actually fetches the flush command. As a result, the decrease in write efficiency can be further prevented, and the reliability of the memory system 1D can be further improved.

Fifth Embodiment

Next, a fifth embodiment will be described. The fifth embodiment is different from the first embodiment in that when a plurality of flush commands are found by pre-reading the submission queue 51, the flush commands are collectively processed. The configuration other than that described below is the same as the configuration of the first embodiment or the second embodiment.

Figure 13:
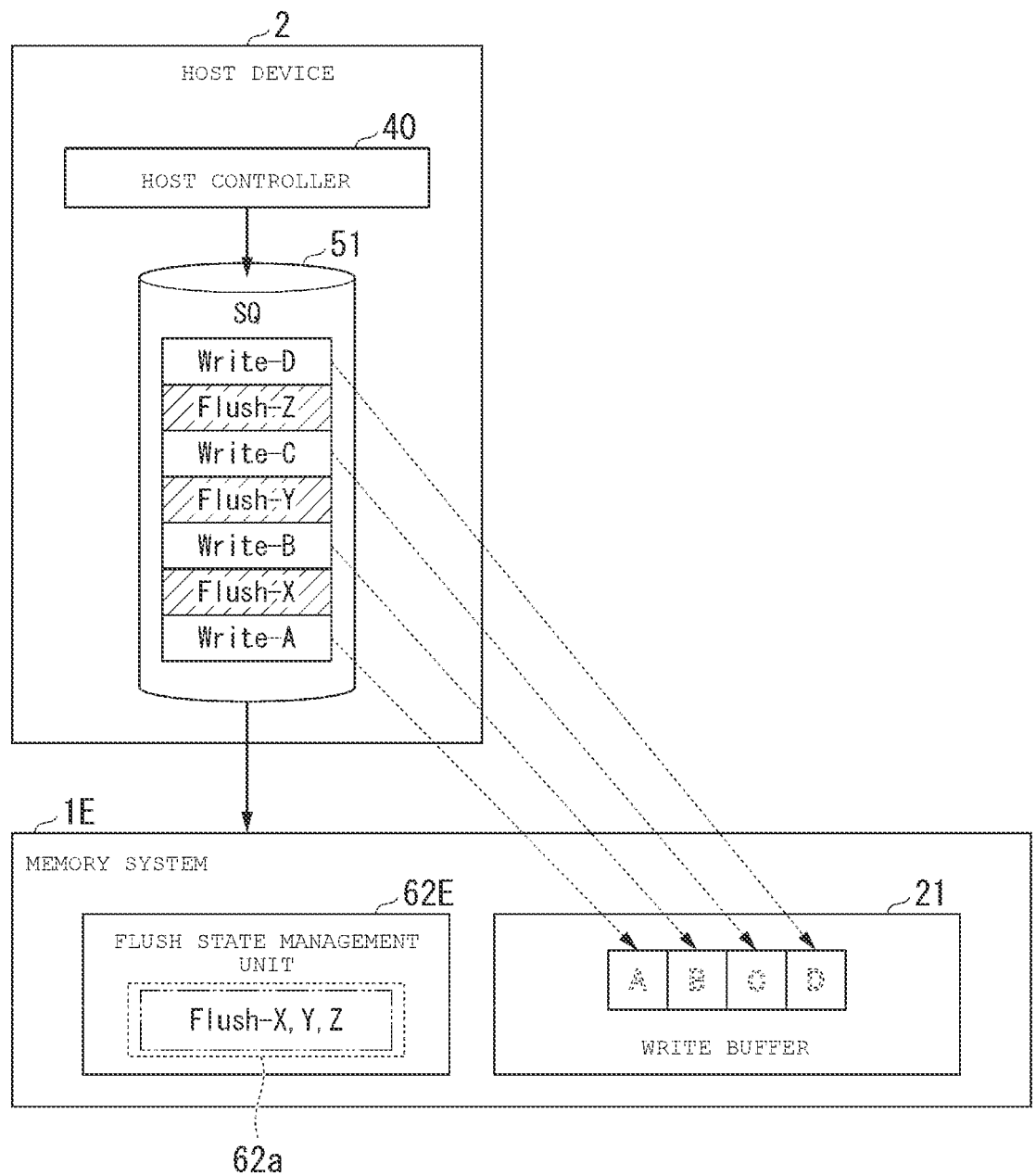
FIG. 13 is a block diagram illustrating a partial configuration of a memory system according to a fifth embodiment.

FIG. 13 is a block diagram illustrating a part of a memory system 1E according to a fifth embodiment. In the example illustrated in FIG. 13, a case where a plurality of flush commands X, Y, and Z (Flush-X, Flush-Y, and Flush-Z) are stored in the submission queue 51 is illustrated. The plurality of flush commands X, Y, and Z are the same type of commands. The flush command X is an example of a "first command". The flush command Y is an example of a "second command".

In at least one embodiment, when the write data satisfying the write units is not stored in the write buffer 21, the command interpretation unit 61 pre-reads the submission queue 51 to see if there is a subsequent write command until the write units are satisfied. When a plurality of flush commands X, Y, and Z are detected by pre-reading the submission queue 51, the command interpretation unit 61 notifies a flush state management unit 62E of information indicating the detected flush commands X, Y, and Z.

When the plurality of flush commands X, Y, and Z are detected by pre-reading the submission queue 51, the flush state management unit 62E collectively stores the plurality of flush commands X, Y, and Z. In this case, the flush state management unit 62E lists and manages the plurality of flush commands X, Y, and Z detected while the write units are not satisfied in order to return a response to the host device 2 as one flush command. Then, when the data A, B, C, and D collected to satisfy the write units have been completely written to the NAND device 10, the command response unit 65 inputs a response indicating that processing of write commands A, B, C, and D corresponding to data A, B, C, and D has been completed and processing of a flush command has been completed to the completion queue 52.

According to such a configuration, the plurality of flush commands X, Y, and Z can be collectively processed. As a result, it is possible to prevent a large amount of padding data from being written to the NAND device 10 by the plurality of flush commands X, Y, and Z.

Sixth Embodiment

Next, a sixth embodiment will be described. The sixth embodiment is different from the first embodiment in that the instruction notified from the host device 2 includes the specification of an operation mode, and the memory system 1F performs different processing according to the specified operation mode. The configuration other than that described below is the same as the configuration of the first embodiment or the second embodiment.

Figure 14:
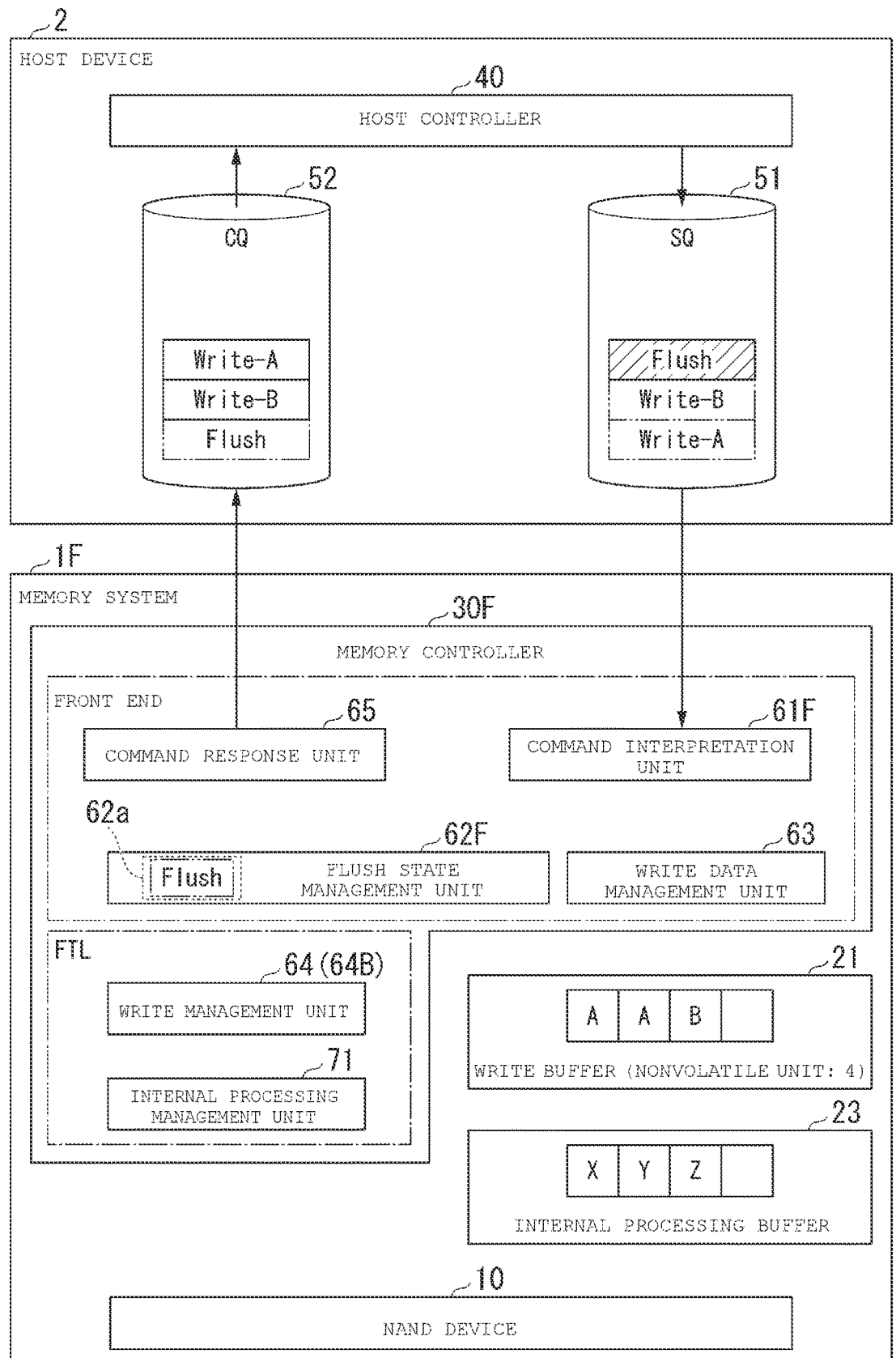
FIG. 14 is a block diagram illustrating a partial configuration of a memory system according to a sixth embodiment.

FIG. 14 is a block diagram illustrating a part of the memory system 1F of the sixth embodiment. In at least one embodiment, the host device 2 issues an instruction including the specification of an operation mode. As the operation mode, for example, any one of (1) fastest operation mode, (2) normal mode, and (3) lifetime priority mode is specified.

The "instruction" may be a command or an instruction different from the command. In at least one embodiment, the host device 2 issues a flush command including the specification of an operation mode. A memory controller 30F selectively switches the operation based on the instruction including the specification of the operation mode received from the host device 2.

The fastest operation mode is an operation mode in which processing including padding of padding data (normal processing of a flush command) is performed when a flush command is received. That is, in the fastest operation mode, even if the write data stored in the write buffer 21 does not satisfy the predetermined write unit, additional write data is not acquired by pre-reading the submission queue 51 and internal data is not acquired from the internal processing buffer 23. In other words, the fastest operation mode is an operation mode in which a large amount of padding data and write data are simultaneously written to the NAND device 10 as compared with the normal mode described later. The fastest operation mode is an example of a "second operation mode".

As described in the first embodiment or the second embodiment, in the normal mode, when the write data stored in the write buffer 21 does not satisfy the predetermined write unit, additional write data is acquired by pre-reading the submission queue 51 and/or internal data is acquired from the internal processing buffer 23, and those data are simultaneously written to the NAND device 10. The normal mode is an example of a "first operation mode".

The lifetime priority mode is an operation mode in which the host device 2 specifies an allowable latency until flush command processing is completed at the same time as issuing a flush command. The latency value may be specified differently, for example, in a situation where the host device 2 or the memory system 1F is placed.

When the lifetime priority mode is specified, a command interpretation unit 61F of the memory controller 30F changes the amount of pre-reading the subsequent commands stored in the submission queue 51 according to the specified latency value. For example, the command interpretation unit 61F changes the depth of the submission queue 51 to be pre-read (the number of entries to be pre-read) and/or the number of submission queues 51 to be pre-read when there are a plurality of submission queues 51. The larger the allowable latency value, the deeper the submission queue 51 to be pre-read, and the larger the number of submission queues 51 to be pre-read.

In at least one embodiment, when the lifetime priority mode is specified, during the time allowed by the specified latency, a flush state management unit 62F reads the internal data from the NAND device 10 and moves the data to the internal processing buffer 23 by internal processing (garbage collection, compaction, refresh, or wear leveling, and the like) of the memory system 1F.

In at least one embodiment, when the lifetime priority mode is specified, the flush state management unit 62F may wait for execution of a flush command within the range allowed by the specified latency until subsequent write commands are input to the submission queue 51 and the write data corresponding to the write command is acquired.

According to such a configuration, flexible processing can be executed according to the situation where the host device 2 or the memory system 1F is placed.

Although some embodiments have been described above, the embodiments are not limited to the above-mentioned examples. In the above-described embodiment, an example in which the "command for writing write data to the nonvolatile memory" is a flush command has been described. However, the "command for writing write data to the nonvolatile memory" is not limited to a flush command, and may be a "Force Unit Access (FUA)=1 Write" command. "FUA=1 Write" is a write command that requires nonvolatile write data.

The data written simultaneously with write data when receiving a flush command is not limited to the write data and internal data obtained by the above-mentioned pre-reading, but may be data stored by the command stored in the submission queue 51 after a flush command or data on the host data buffer 53. The "nonvolatile semiconductor storage device" and the "nonvolatile memory" are not limited to the NAND device 10, and may be a magnetoresistive random access memory (MRAM) or other type of storage device.

According to at least one embodiment described above, in a state where the first data not satisfying the write units is stored in the write buffer, when the memory system receives a command for writing the first data to the nonvolatile memory from the queue, the memory system simultaneously writes the first data and the other second data to the nonvolatile memory. As a result, reliability can be improved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host device, the memory system comprising:
   a nonvolatile memory;
   a volatile memory including a write buffer; and
   a memory controller configured to receive a command from a queue, the command being stored in the queue by the host device, wherein
   when first data not satisfying a write unit is stored in the write buffer and a first command for writing the first data to the nonvolatile memory is received from the queue, the memory controller is configured to:
   pre-read one or more subsequent commands stored in the queue after the first command, and
   when a first write command is included in the one or more subsequent commands, write the first data and first write data to the nonvolatile memory, the first write data corresponding to the first write command.

2. The memory system according to claim 1, wherein the memory controller is configured to output a response indicating that processing of the first command and the first write command has been completed to the host device in response to writing the first write data to the nonvolatile memory as a second data.

3. The memory system according to claim 1, wherein the memory controller is configured to:
   when a sum of the first data and a second data does not satisfy the write unit, determine whether or not there is a second write command stored in the queue after the first write command, and
   when there is the second write command, write second write data corresponding to the second write command to the nonvolatile memory simultaneously with the first data and the second data.

4. The memory system according to claim 1, wherein the memory controller is configured to:
   when there is no write command in the one or more subsequent commands, write the first data to the nonvolatile memory in response to the first command.

5. The memory system according to claim 1, wherein the queue includes a first queue and a second queue, the second queue being different from the first queue, and the memory controller is configured to:
   when receiving the first command from the first queue, pre-read commands stored in the first queue and the second queue, and
   when there is a write command in either the first queue or the second queue, write data corresponding to the write command to the nonvolatile memory as a second data.

6. The memory system according to claim 1, wherein the memory controller is configured to:
   manage each data in correlation with attribute information indicating an attribute of each data, and
   when the attribute information correlated with the first data and the attribute information correlated with the second data satisfy a predetermined relationship, simultaneously write the first data and a second data to the nonvolatile memory.

7. The memory system according to claim 6, wherein the attribute information is set based on at least one of an access frequency for each data, a group set for each data, or a type of a command of which each data is written in the past.

8. The memory system according to claim 1, wherein the memory controller is configured to:
   when the first command is detected by pre-reading the queue, start processing of reading data to be written as a second data from the nonvolatile memory, and move the data to the predetermined region of the volatile memory before or during execution of a precedent command stored in the queue prior to the first command.

9. The memory system according to claim 1, wherein the memory controller is configured to:
   when a write command is stored in the queue after the first command and a second command, the write command being of the same kind as the first command, is stored in the queue after the write command, output to the host device a response indicating that processing of the first command and the second command has been completed in response to writing write data corresponding to the write command to the nonvolatile memory as the second data simultaneously with the first data.

10. The memory system according to claim 1, wherein the memory controller is configured to selectively switch between a first operation mode and a second operation mode, the first operation mode being such that when the first command is received, the first data and a second data are simultaneously written to the nonvolatile memory,
the second operation mode being such that when the first command is received, padding data more than that in the first operation mode is performed, and the first data are written to the nonvolatile memory, based on an instruction notified from the host device.

11. The memory system according to claim 1, wherein the memory controller is configured to:
　　read data to be written as a second data from the nonvolatile memory and move the data to the predetermined region of the volatile memory during a time allowed by latency specified by the host device, and
　　simultaneously write the first data and the second data to the nonvolatile memory.

12. A memory system connectable to a host device, the memory system comprising:
　　a nonvolatile memory;
　　a volatile memory including a write buffer, and
　　a memory controller configured to receive a command from a queue, the command being stored in the queue by the host device, wherein
　　the memory controller is configured to:
　　　　when first data not satisfying a write unit is stored in the write buffer and a first command for writing the first data to the nonvolatile memory is received from the queue, determine whether or not there is data to be written in the predetermined region of the volatile memory, and
　　　　when there is the data to be written in the predetermined region of the volatile memory, write the data to be written to the nonvolatile memory with the first data.

13. The memory system according to claim 12, wherein the data to be written is data that is read from the nonvolatile memory, stored in the predetermined region of the volatile memory, and then rewritten to the nonvolatile memory.

14. The memory system according to claim 12, wherein the data to be written is data that moves within the memory system by garbage collection, compaction, refresh, or wear leveling.

15. A memory system comprising:
　　a nonvolatile memory;
　　a volatile memory including a write buffer; and
　　a memory controller configured to:
　　receive a command stored in a queue by a host device; and
　　simultaneously write first data and second data acquired from the host device or a predetermined region of the volatile memory different from the write buffer, to the nonvolatile memory, if the first data not satisfying a write unit is stored in the write buffer, and a first command for writing the first data to the nonvolatile memory is received from the queue, wherein
　　the memory controller is configured to change an amount of pre-reading subsequent commands stored in the queue after the first command based on an instruction notified from the host device.

16. The memory system according to claim 15, wherein when receiving the first command from the queue, the memory controller is configured to:
　　pre-read one or more subsequent commands stored in the queue after the first command, and
　　when a first write command is included in the one or more subsequent commands, write first write data corresponding to the first write command to the nonvolatile memory as the second data.

17. The memory system according to claim 16, wherein the memory controller is configured to output a response indicating that processing of the first command and the first write command has been completed to the host device in response to writing the first write data to the nonvolatile memory as the second data.

18. The memory system according to claim 16, wherein the memory controller is configured to:
　　when a sum of the first data and the second data does not satisfy the write unit, determine whether or not there is a second write command stored in the queue after the first write command, and
　　when there is the second write command, write second write data corresponding to the second write command to the nonvolatile memory simultaneously with the first data and the second data.

19. The memory system according to claim 16, wherein the memory controller is configured to:
　　when there is no write command in the one or more subsequent commands, write the first data to the nonvolatile memory in response to the first command.

20. The memory system according to claim 15, wherein the queue includes a first queue and a second queue, the second queue being different from the first queue, and the memory controller is configured to:
　　when receiving the first command from the first queue, pre-read commands stored in the first queue and the second queue, and
　　when there is a write command in either the first queue or the second queue, write data corresponding to the write command to the nonvolatile memory as the second data.

* * * * *